Oct. 1, 1957

N. E. ANDERSON 2,808,499

APPARATUS FOR ELECTRIC ARC WELDING

Filed Jan. 31, 1955

INVENTOR
NELSON E. ANDERSON
BY
ATTORNEY

Oct. 1, 1957          N. E. ANDERSON          2,808,499

APPARATUS FOR ELECTRIC ARC WELDING

Filed Jan. 31, 1955          2 Sheets-Sheet 2

INVENTOR
NELSON E. ANDERSON
BY
ATTORNEY

United States Patent Office 2,808,499
Patented Oct. 1, 1957

2,808,499

APPARATUS FOR ELECTRIC ARC WELDING

Nelson E. Anderson, Berkeley Heights, N. J., assignor to Air Reduction Company, Incorporated, New York, N. Y., a corporation of New York Application January 31, 1955, Serial No. 485,132

4 Claims. (Cl. 219—135)

This invention relates to welding with a continuously fed welding wire and more particularly to electric arc welding with a consuming electrode.

In all types of welding in which a welding wire is fed to the weld zone to supply filler metal to the weld, good control of the feed of such a wire is essential to the production of a uniform and consistently satisfactory weld. This control becomes more critical in those welding processes in which the wire is melted off at a high rate. Two welding processes in which the welding wire is the welding electrode and the feed rates are very high are the inert gas shielded metal arc welding process disclosed in the Muller et al. Patent No. 2,504,868 and the submerged arc welding process disclosed in the Jones et al. Patent No. 2,043,960. In these and other processes it is essential that the wire feed start and stop promptly in timed relation to other components of the process without any appreciable lag or delay in building up to speed or in coming to rest. Failure of the wire to build up to speed promptly after initiation of the arc can result in extinction of the arc due to overextension thereof or at least in impaired weld quality. Coasting, or overrunning of the wire at the end of a weld results in the wire being injected into the weld metal to spoil the weld, or at least it results in an unacceptable protrusion of the wire from the welding head making it necessary for the operator to cut off the end of the wire before a new weld can be started. This involves a costly loss of welding wire and operators time. Apparatus has been provided in the past for promptly stopping the wire by electrical or mechanical braking. While such systems do act to prevent coasting, or overrunning of the wire at the end of the weld they are generally expensive and bulky and they do not aid in providing quick acceleration and prompt starting of the wire feed. Further, sudden stopping of a motor of adequate power to meet the requirements of the welding processes causes great mechanical strain to be exerted on the motor and speed reduction gear assemblies.

It is an object of the present invention therefore to provide a method and apparatus for electric arc welding in which the welding wire feed can be started and stopped substantially instantaneously.

Another object of the present invention is to provide an arc welding system in which the wire feed can be substantially instantaneously interrupted without exerting appreciable inertia forces on the drive motor and the associated apparatus.

Another object of the present invention is to provide a welding system in which the energization of the wire feed motor depends on the operation of a control switch and the feeding of the wire by said motor depends on electrical conditions in the arc circuit.

Another object of this invention is to provide an improved wire feed control apparatus which is responsive to the welding conditions and which immediately interrupts the travel of the welding wire when the arc is extinguished.

Another object of the present invention is to provide a welding control system having a novel sequence of operation adapted to insure prompt starting and stopping of the welding wire feed.

Another object of the present invention is to provide a novel electro-mechanical system for the control of the flow of shielding gas, the flow of cooling water, welding current, and welding wire feed, in water-cooled, gas shielded arc welding apparatus.

These and other objects and advantages of the invention will be pointed out or will become apparent from the following detailed description of one embodiment of the invention shown for purposes of illustration in the accompanying drawings.

According to the present invention a clutch is included in the mechanism coupling the wire feed motor to the wire feed roll so that the motor can be brought up to speed before the clutch is engaged to start the wire feed and so that the inertia of the motor and the reduction gears and other associated mechanism can be uncoupled from the wire feed roll by disengaging the clutch for instantaneous interruption of the wire feed. In addition the present invention provides inter-related controls for the actuation of the clutch and the wire feed motor and other elements of the welding process.

Figure 1:
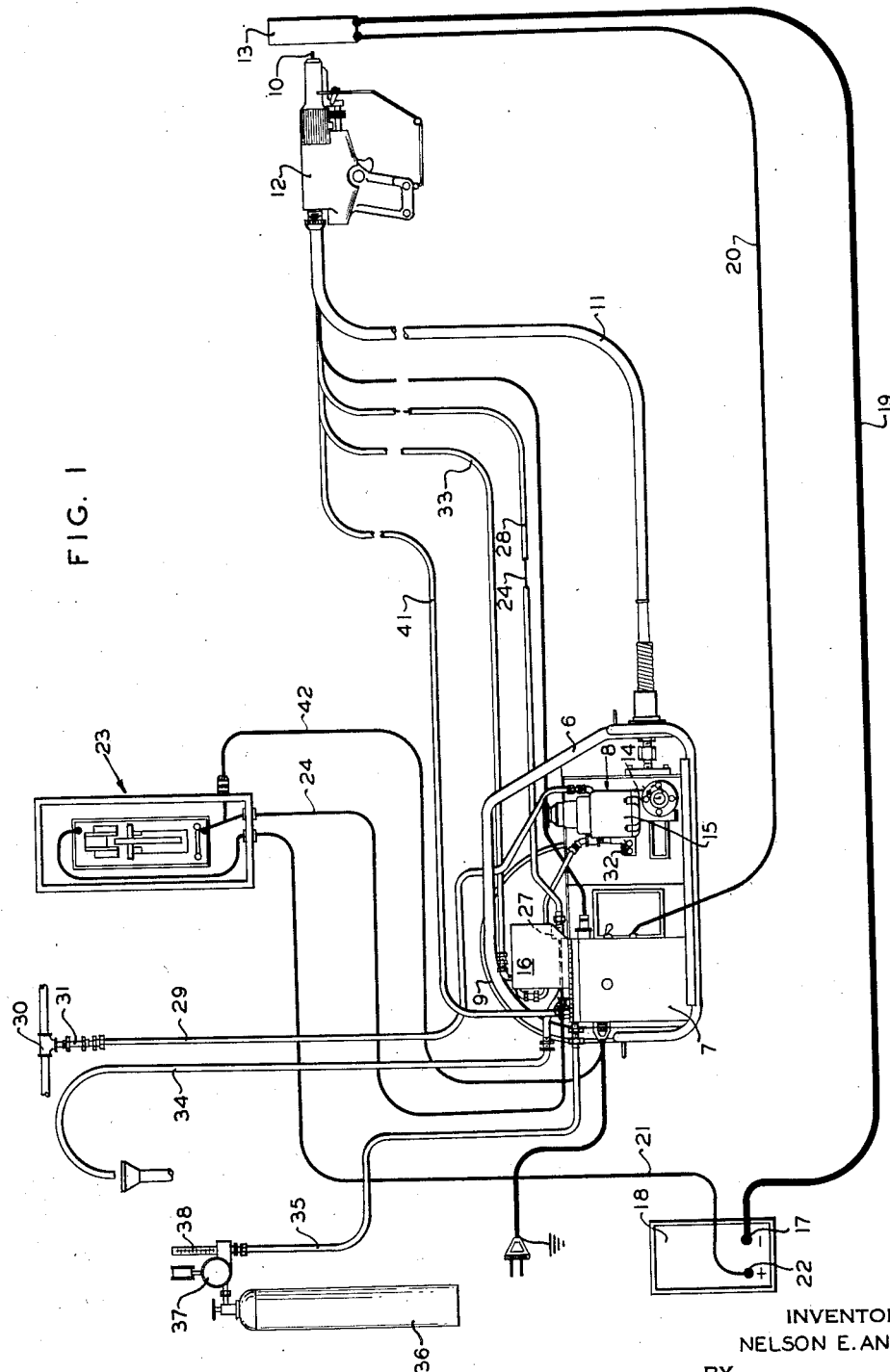
Fig. 1 illustrates welding apparatus embodying the invention.

Referring to the drawings, the apparatus shown therein comprises a portable carriage assembly 6 which supports the operating control housing 7, a wire drive mechanism 8, a wire supply reel 9 and a gas and water time delay relay assembly 16. The wire drive mechanism 8 includes a centrifugal governor controlled constant speed motor 15, speed reducing gears, a solenoid operated friction clutch 63 and nip rolls 14 for gripping and feeding a welding wire. The clutch is preferably located adjacent the nip rolls so as to reduce to a minimum the inertia of the parts driven by the clutch. In operation a wire electrode 10 is withdrawn from the supply reel 9 by the drive rolls 14. The drive motor 15 actuates the drive rolls 14 causing the electrode 10 to feed toward a workpiece 13 through a flexible conduit 11 which interconnects a welding head 12, here shown in the form of a manual welding gun (and hereinafter referred to as a gun), and the drive mechanism 8. A welding cable 19 interconnects the workpiece 13 with one terminal 17 of a welding current source 18. A control circuit ground lead 20 connects the workpiece to the operating controls. A welding cable 21 affixed to the other terminal 22 of the welding current source 18 is connected to a welding contactor 23 comprising a solenoid operated switch having circuit interrupting contacts 23a. A cable 24 leads from the contactor to the welding gun 12 through terminal 27 mounted on the time delay relay assembly 16. Cable 42 connects the contactor solenoid operating coil 23 to the operating controls 7. The welding circuit thus formed includes the source of welding current 18, the contactor contacts 23a, the welding gun 12, and the electrode 10 and the workpiece 13.

Figure 2:
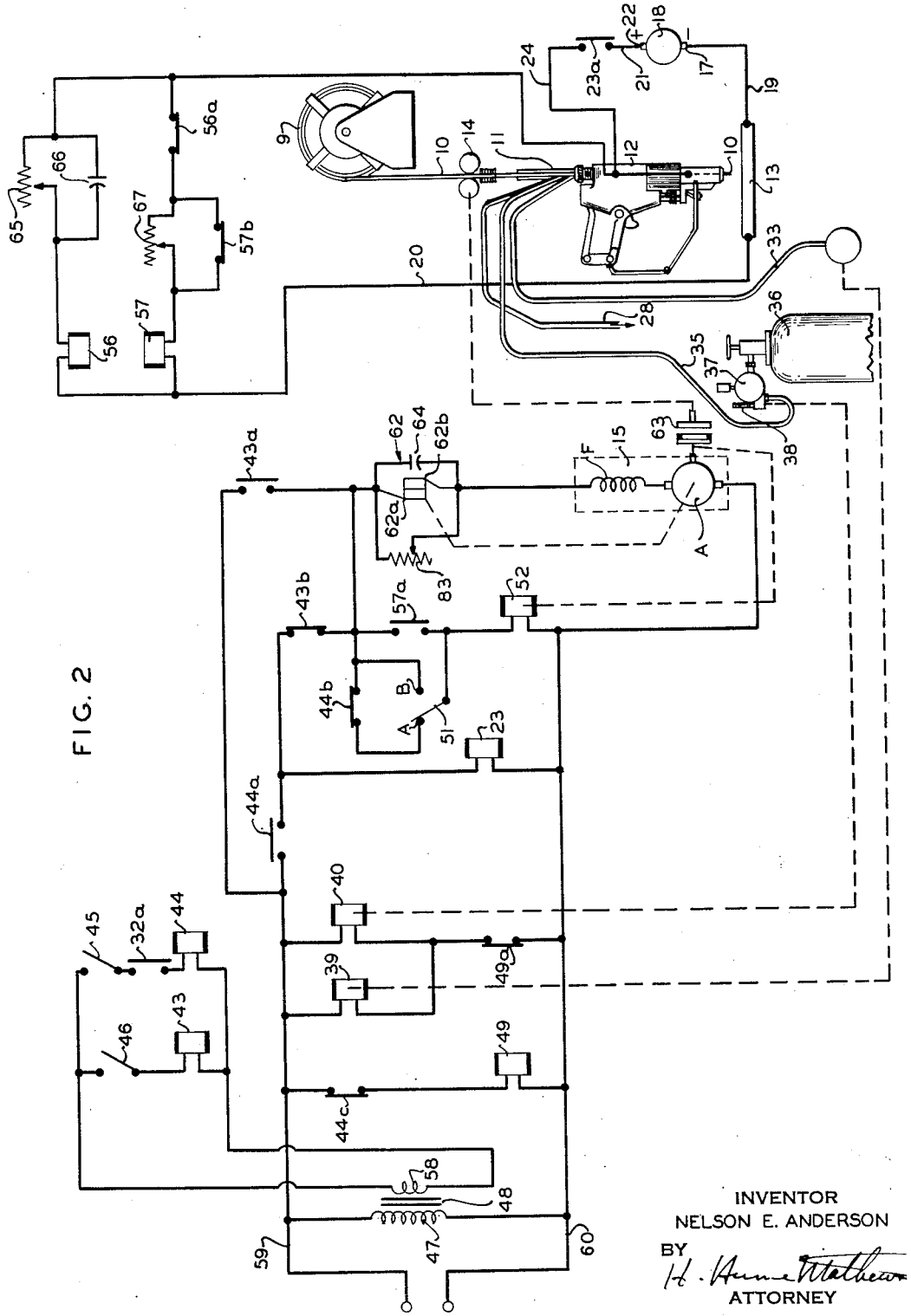
Fig. 2 is an electro-mechanical schematic diagram of the welding apparatus illustrated in Fig. 1 embodying a preferred form of the invention.

A water supply conduit 29 may be connected to any suitable source of water 30 which is capable of delivering water to the welding gun 12 at a sufficient rate, usually in excess of two pints per minute. This water supply system includes a water filter 31 situated in the supply conduit 29 upstream of a water pressure switch 32. If the water pressure is less than a predetermined minimum required to furnish an adequate supply of water, the contacts 32a of the pressure switch 32 will not close and the welding operation cannot be effected. However, if the welding operation has already commenced and the water pressure should subsequently drop below the required minimum the switch contacts 32a will then open and interrupt the operation. Also included in the water supply system are a water solenoid valve 40 (shown schematically in Fig. 2 and physically located in the gas and water time delay relay assembly 16) a water inlet conduit 33 for carrying water to the gun 12, a water outlet conduit 28 which surrounds a portion of the welding current conductor 24 to cause the exhausting cooling water to pass over that portion of the conductor 24 to cool it, and a water drain 34.

An arc shielding gas supply system is provided which includes a gas supply conduit 35 connected to any suitable source of gas supply. In this instance the supply conduit 35 is connected to a compressed gas cylinder 36 through a pressure regulator 37 and a flowmeter 38. The gas supply system also includes a gas solenoid valve 39 housed in the gas and water time delay relay assembly 16 (and shown schematically in Fig. 2).

A supply conduit 41 interconnects the welding gun 12 with the supply line 35 through the valve 39. During the welding operation the electrically controlled water and gas solenoid valves are so actuated as to provide the gun with a supply of cooling water and shielding gas prior to striking the arc and to maintain a constant flow of said water and gas for a short time after the arc has been extinguished. Referring now to the control circuit illustrated in Fig. 2, it can be seen that said circuit comprises three main sub-circuits. The first sub-circuit operates on low voltage (6.3 volts) from a secondary winding 58 of a transformer 48 and includes a trigger switch 45, a jog switch 46, and control relays 43 and 44; the second sub-circuit operates at 115 volts and includes the primary 47 of the transformer 48, a gas and water time delay relay 49, gas and water valve solenoids 39 and 40, the welding contactor coil 23, a selector switch 51, a clutch solenoid 52, and the governor controlled motor 15 for the electrode wire feed; the third sub-circuit operates on welding voltage, preferably from a D. C. source having an open circuit voltage in excess of 55 volts, and includes the voltage sensitive wire feed control relays 56 and 57.

After the welding current source, the cooling water, and the shielding gas are operatively connected to the welding gun, the workpiece, and the carriage, the selector switch 51 is positioned in accordance with the type of welding start to be made. If an electrode wire of high electrical conductivity such as aluminum is to be used the electrode must be brought into contact with the workpiece and then withdrawn in order to establish an arc therebetween. The wire feed is started immediately thereafter. Such a start is obtained with the above described controls when the selector switch 51 is in the "A" position. However, when an electrode of lower conductivity such as steel is employed the selector switch 51 is placed in the "B" position, and the ground lead 20 is detached removing the wire feed control relays 56 and 57 from the circuit. When this arrangement is used the clutch solenoid 52 is energized and the electrode wire begins to feed as soon as the trigger 45 is depressed.

With the source of welding current, the cooling water, and the shielding gas in operative condition and the selector switch in the "A" position an alternating current of 115 volts is applied to the circuit through the conductors 59 and 60. The primary 47 of the power transformer 48 is energized and thereby induces a voltage in the secondary 58 of 6.3 volts. Concurrently, the motor of the time delay relay 49 begins to run or "time out" for a predetermined length of time. During this "timing out" period the relay contacts 49a remain closed and the 115 volt current is applied to both the gas and water solenoids 39 and 40 causing them to open and allowing the gas and water to flow. After the motor of the time delay relay 49 has "timed out" the relay contacts 49a will open and interrupt the current being applied to said gas and water solenoids. The contacts 49a will remain in this open position as long as the 115 volts are being applied to the motor of the time delay relay 49 and the flow of the gas and water will be caused to cease until such time as the contacts 49a are again closed. During this entire period the normally open contacts 43a and 44a of the control relays 43 and 44 respectively prevent any further action of the circuit.

When the wire jog switch 46 is closed the wire jog control relay 43 becomes energized thereby effecting the closure of the normally open jog control relay contacts 43a. With the contacts 43a closed, 115 volts are applied to the clutch solenoid 52, causing the clutch to become engaged, and to the wire feed motor 15 causing it to rotate.

Power is supplied to the clutch solenoid 52 through conductors 59 and 60, relay contacts 43a and 44b, and switch 51 ("A" position). Power is supplied to the wire feed motor 15 through conductors 59 and 60, relay contacts 43a, and governor 62. Since the wire feed motor 15 begins to run concurrently with the energization of the clutch solenoid the clutch 63 is engaged and the wire is caused to feed. The normally closed contacts 43b in the motor circuit are opened when the jog control relay 43 is energized and the current is prevented from feeding back through the circuit to the welding contactor coil 23. After a desired length of wire has been fed, the operator merely releases the jog switch 46 causing the jog control relay 43 to de-energize, contacts 43a to open and contacts 43b to close. When said contacts are so actuated both the clutch solenoid 52 and the wire feed motor 15 de-energize, the clutch 63 disengages, and the wire feed is instantaneously interrupted.

With the welding gun and the electrode wire therein in welding position the trigger switch 45 is closed causing the main control relay 44 to be energized. The normally closed contacts 44c in the time delay relay circuit now open and de-energize the motor of the time delay relay 49. As a result the contacts 49a are returned to their normally closed position and 115 volts from conductors 59 and 60 are applied to the gas and water solenoids 39 and 40 causing them to open the respective valves and allow gas and water to flow for the welding operation.

At the same time the normally open contacts 44a close completing the 115 volt circuit through the coil of the welding contactor 23 and through the wire feed motor 15. A centrifugal governor 62, having its breaker points 62a and 62b in series with the motor field F and armature A controls the speed of rotation of the wire feed motor 15. A resistor 83 and a capacitor 64 are placed in parallel with the governor points 62a and 62b to reduce arcing at the points and to provide better governor action at reduced motor speeds. Energization of the main control relay 44 also effects the opening of the normally closed contacts 44b in the motor circuit. This prevents any current from reaching the clutch solenoid 52 and consequently prohibits the wire from feeding.

When voltage is applied to the coil of the welding contactor 23, the contacts 23a close in the welding circuit allowing the open circuit voltage of the welding current source which is in excess of 55 volts to be impressed across the wire feed control relays 56 and 57. Relay 56 is a quick acting relay designed to operate at a voltage of between 45–50 volts and is de-energized when the voltage drops below 35 volts. This relay is placed in series with the parallel combination of a resistor 65 and a capacitor 66 to assure the quick action and correct operation thereof. Relay 57 is designed to operate at 11 volts and is placed in series with the normally closed contacts 56a, and the parallel combination of contacts 57b and a resistor 67 which protects the relay against overvoltage.

When open circuit voltage is applied to the welding circuit both relays 56 and 57 are simultaneously energized. Relay 57 however, is only momentarily energized since the normally closed contacts 56a will be opened when the quick acting relay 56 is caused to operate and no further action will take place throughout the circuit until the arc is struck.

When the electrode 10 is touched to the workpiece 13 the welding voltage momentarily drops to zero because of the short circuit condition. The control relay 56 is de-energized as the voltage drops below 35 volts and the open contacts 56a are caused to close placing relay 57 again in the circuit. When the arc has been established and the welding voltage rises to 11 volts, the relay 57 becomes energized effecting closure of the normally open contacts 57a in the clutch solenoid circuit and causing the normally closed contacts 57b in the relay circuit to open. When contacts 57b open the voltage limiting resistor 67 is then placed in series with the relay 57 protecting it against overvoltage as the voltage begins to rise.

Closure of the normally open contacts 57a allows 115 volts to be applied to the clutch solenoid 52. When the solenoid becomes energized the clutch 63 engages and the wire begins to feed at a constant speed set by the governor 62.

If the arc is broken during the welding operation without releasing the trigger 45 the welding voltage will rise to a level at which the control relay 56 will be re-energized thereby causing the normally closed contacts 56a to open and the circuit to relay 57 to be broken.

When the relay 57 becomes de-energized contacts 57a are returned to the normally open position thus preventing any further current flow through the clutch solenoid 52, and thereby effecting the disengagement of the clutch 63 and the immediate interruption of the wire feed.

If however, the trigger 45 is released at any time during the operation, relay 44 will become de-energized, contact 44a will then be opened by the action of said relay, and the circuits to the welding contactor 23, the clutch solenoid 52, and the wire drive motor 15 will be broken. When the circuit to the clutch solenoid 52 is broken, the clutch 63 is caused to disengage and the wire feed is instantaneously halted.

Concurrently with the de-energization of relay 44 will be the return of contact 44c to its normally closed position supplying 115 volts A. C. to the motor of time delay relay 49. Said motor will then begin to run or "time out" for a pre-determined period of time to allow a post weld gas and water flow. After the "timing out" period has elapsed, contacts 49a will open and de-energize the gas and water solenoids thus permitting the valves to close and terminate the flow of these fluids.

If selector switch 51 is placed in the "B" position and the ground lead 20 is not attached the wire feed control relays 56 and 57 are disconnected from the circuit and do not operate. When trigger control is used with the selector switch 51 in the "B" position then the same sequence of operations occurs as in the "A" position with the exception that as soon as the trigger 45 is depressed the clutch solenoid 52 is energized and wire will start to feed. If the arc is interrupted and the trigger is not released the wire will continue to feed until such time as the trigger is released.

The invention has been described in detail as applied to a consuming electrode inert gas shielded metal arc welding process. It is obviously equally applicable to other arc welding processes employing a consuming electrode as well as to consuming and non-consuming electrode processes employing an auxiliary filler wire. In the case of the non-consuming electrode arc, a clutch operated wire feed control, analogous to that described above, may be employed to feed an auxiliary filler wire to the arc. The invention may also be adapted for feeding two or more wires if required. While the specific disclosure above relates to a manual welding head, or gun, the invention is equally applicable to the machine type welding installation, where the welding head is fixed.

It will be evident that as a result of this invention substantially instantaneous stopping and starting of a welding wire feed has been made possible with relatively simple low cost components. While only one embodiment of the invention has been shown and described in detail, it is to be understood that the invention is not limited to the particular form shown but may be used in other ways without departure from its spirit as defined by the following claims.

I claim:

1. Electric arc welding apparatus comprising an electrode wire feed roll adapted to make driving engagement with an electrode wire, electric motor means having sufficient inertia to prevent substantially instantaneous stopping of said means after de-energization for driving said wire feed roll, mechanical means including a clutch coupling said motor means to said feed roll, and means for disengaging said clutch substantially simultaneously with the interruption of power to said motor to effect substantially instantaneous stopping of said wire feed when said motor is de-energized.

2. Electric arc welding apparatus comprising a source of welding electrode wire, a welding head, a wire feed roll adapted to make driving engagement with said wire to propel said wire through said head to a welding zone, electric motor means including a motor actuating switch for driving said wire feed roll, means including a clutch coupling said motor means to said feed roll, a source of welding current, means including a circuit interrupting contactor electrically connecting said source of welding current to a workpiece and to said welding head, means in said welding head for transferring welding current to said electrode wire, a source of shielding gas, means including a valve placing said source of shielding gas in communication with said welding head whereby said gas can be delivered to said weld zone in a manner to shield the end of the electrode, the arc, and the molten weld metal produced thereby, a control switch, means responsive to the actuation of said switch to open said valve and initiate the flow of said shielding gas, to close said contactor and place the open circuit voltage of said welding current source between said electrode and said workpiece, and to close said motor actuating switch to energize said motor means, a first voltage sensitive relay connected across said electrode and said workpiece, responsive to minimum operable arc voltage, and having normally open contacts in the circuit of a magnetizing coil adapted when energized, to cause engagement of said clutch, and a second voltage sensitive relay connected across said electrode and said workpiece, responsive to voltage in excess of the maximum operable arc voltage, and having normally closed contacts in series with the magnetizing coil of said first voltage sensitive relay, said first and second voltage sensitive relays cooperating to maintain the clutch disengaged and the wire feed roll inoperative on low voltage and open circuit voltage conditions and the clutch engaged and the wire feed roll operative during normal arc voltage conditions to feed said wire to the weld zone at a rate determined by the speed of rotation of said motor.

3. Consuming electrode electric arc welding apparatus comprising a wire guide, a feed roll adapted to engage an electrode wire to propel said wire through said wire guide to a welding arc formed across an arc gap between said wire and a workpiece, a motor for driving said feed roll, means including a clutch mechanically coupling said motor to said feed roll, switch means for energizing said motor independently of the electrical conditions across the arc gap, means for disengaging said clutch whenever said motor is de-energized and voltage sensitive relay means across the arc gap acting when said motor is energized to maintain the clutch disengaged on low voltage and open circuit arc voltage conditions and engaged only during those periods when the arc voltage is between predetermined limits which coincide substantially with the values of arc voltage resulting from the maintenance of a useful welding arc, said clutch when engaged causing said motor to feed said wire to the weld zone at a rate determined by the speed of rotation of said motor.

4. Electric arc welding apparatus comprising a source of welding electrode wire, a welding head, a wire feed roll adapted to make driving engagement with said wire to propel said wire through said head to a welding zone, electric motor means including a motor actuating switch for driving said wire feed roll, means including a clutch coupling said motor means to said feed roll, a source of welding current, means including a circuit interrupting contactor electrically connecting said source of welding current to a workpiece and to said welding head, means in said welding head for transferring welding current to said electrode wire, a source of shielding gas, means including a valve placing said source of shielding gas in communication with said welding head whereby said gas can be delivered to said weld zone in a manner to shield the end of the electrode, the arc, and the molten weld metal produced thereby, a control switch, means responsive to the actuation of said control switch to open said valve and initiate the flow of said shielding gas, to close said contactor and place the open circuit voltage of said welding current source between said electrode and said workpiece, and to close said motor actuating switch to energize said motor means, and means responsive to the change in electrical conditions between the electrode and the workpiece when said motor is energized to actuate contacts in the circuit of a magnetizing coil which controls the engagement and disengagement of said clutch to cause said clutch to be disengaged and the wire feed roll inoperative when open circuit and short circuit electrical conditions prevail between the electrode and workpiece and to cause said clutch to be engaged and the wire feed roll operative when arcing conditions prevail between the electrode and workpiece.

References Cited in the file of this patent

UNITED STATES PATENTS

| | | |
|---|---|---|
| 1,287,774 | Sessions | Dec. 17, 1918 |
| 1,634,624 | Morton | July 5, 1927 |
| 1,701,372 | Jefts | Feb. 5, 1929 |
| 2,020,278 | Larson | Nov. 5, 1935 |
| 2,504,868 | Muller | Apr. 18, 1950 |